United States Patent [19]

Takahashi

[11] Patent Number: 5,044,839
[45] Date of Patent: Sep. 3, 1991

[54] THROW AWAY INSERT

[75] Inventor: Nobuhiro Takahashi, Itami, Japan

[73] Assignee: Sumitomo Electric Industries, Ltd., Osaka, Japan

[21] Appl. No.: 574,286

[22] Filed: Aug. 28, 1990

[30] Foreign Application Priority Data

Aug. 31, 1989 [JP] Japan ............... 1-102495[U]

[51] Int. Cl.$^5$ ............................................ B23B 27/22
[52] U.S. Cl. .................................................. 407/114
[58] Field of Search ............... 407/113, 114, 115, 116, 407/117, 120

[56] References Cited

U.S. PATENT DOCUMENTS

| | | | |
|---|---|---|---|
| 4,359,300 | 11/1982 | Hazra | 407/114 |
| 4,411,565 | 10/1983 | Hazra | 407/114 |
| 4,616,963 | 10/1986 | Habert | 407/114 |
| 4,685,844 | 8/1987 | McCreery | 407/114 |
| 4,720,217 | 1/1988 | Bonjour | 407/114 |
| 4,859,122 | 8/1989 | Patterson | 407/114 |
| 4,880,338 | 11/1989 | Stashko | 407/114 |
| 4,915,548 | 4/1990 | Fouquet | 407/114 |
| 4,941,780 | 7/1990 | Takahashi | 407/114 |

FOREIGN PATENT DOCUMENTS 115442 5/1989 Japan .

Primary Examiner—Frederick R. Schmidt
Assistant Examiner—Blynn Shideler
Attorney, Agent, or Firm—Wenderoth, Lind & Ponack

[57] ABSTRACT

A polygonal throw-away insert defining a cutting edge at the periphery thereof, a center land and a breaker groove formed therein between the cutting edge and the center land. Pairs of slopes protrude upwardly in the breaker groove, near each corner portion of the insert, at an oblique angle of 5-20 degrees and in symmetrical relation with each other with respect to the bisectors of the corner portion so as to define a ridge therebetween. Breaker protrusions extend from the center land toward the corner portions and have tapered ends. Breaker walls extend obliquely upwardly from rear ends of the pairs of slopes to the front ends of the breaker protrusions, respectively. And ellipsoidal grooves are formed in the breaker grooves so as to be contiguous with the breaker walls.

6 Claims, 2 Drawing Sheets

THROW AWAY INSERT

BACKGROUND OF THE INVENTION

This invention relates to a throw-away insert, and more specifically to an improvement in a chip breaker which will facilitate smooth chip disposal during operation between a medium cutting operation and a heavy cutting operation.

In cutting operations, it is extremely important to break and discharge the chips smoothly for better workability. To achieve this, various chip breakers have been developed. It has been a common practice to consider three cutting operations, i.e. light cutting, medium cutting and heavy cutting operations dependent upon the cutting conditions (cutting speed, feed rate, and depth of cut) as shown in FIG. 4, and to develop a chip breaker suitable for carrying out each cutting operation. But because a lower depth of cut can now be made as a result of improvements in the dimensional accuracy and increased feed rate under which the material can be machined, new cutting operations, which are not covered by any of the above-said cutting operations, tend to become required.

These new operations are two which, as represented by the new high-feed rate region shown in FIG. 4, do not overlap with the medium cutting operation o the heavy cutting operation.

The more important among the two operations is the one performed at a higher feed rate than the medium cutting operation and carrying out a smaller depth of cut than the high cutting operation, that is, the hatched region in FIG. 4. This is because the chips produced in carrying out the operation corresponding to this region tend to be thicker and more difficult to break. Thus the development of a chip breaker which is effective for carrying out this operation is desired.

Prior art throw-away inserts disclosed in Japanese Examined Utility Model Publications 57-30004 and 1-15442 can be used to carry out both the light cutting operation and the medium one. But these inserts have the following problems.

When the depth of cut is so small as to be less than or equal to the nose radius, the chips are discharged substantially in the direction of the bisector of the nose angle. It is well known that as the depth of cut increases, the direction in which the chips are discharged approaches the direction in which the straight portion of the cutting edge extends (opposite to the feed direction).

For the new high-feed rate region where the depth of cut is 1–5 mm and the feed rate is 0.3–0.7 mm/rev., an insert having a nose radius of 1.2–1.6 mm is ordinarily used. In such a case, as the depth of cut increases, the chip discharge angle $\theta$ will change from the state shown in FIG. 5 where the depth of cut is small (1–2 mm) to the state shown in FIG. 6 where it is large (4–5 mm).

For a medium feed rate (f=0.314 0.4 mm/rev.), a narrower chip breaker as shown in FIG. 7 is preferable, whereas for a high feed rate, a wider chip breaker as shown in FIG. 8 is effective because the chips produced in such a state tend to be thick and difficult to break.

Since, as described above, the direction in which the chips are discharged changes with the depth of cut and the optimum width of chip breaker changes with the feed rate, it was very difficult to design a chip breaker which could be used not only to carry out the conventional cutting operation but also the new operations in which the depth of cut is to be small and the feed rate is to be high.

The throw-away inserts disclosed in the above-mentioned publications both define a breaker groove near each corner thereof and a protrusion extending toward the tip of the corner to in effect expand the cutting operating range. But because such a protrusion narrows the width of the chip breaker groove, it tends to cause chip clogging at a high feed rate. Thus, with these inserts, the cutting operating range can be expanded from the low cutting operation toward the medium one to some extent. But they cannot be used to carry out a heavy cutting operation in which the feed rate is high.

SUMMARY OF THE INVENTION

It is an object of the present invention to provide a throw-away insert having a chip breaker which allows the insert to carry out a cutting operation represented by the new region shown in FIG. 4.

In accordance with the present invention, there is provided a throw-away insert defining a cutting edge at the periphery thereof, a center land and a breaker groove formed between the cutting edge and the center land, characterized in that a pair of slopes protrude upwardly in the breaker groove near each of corner portions of the insert, the slopes extending obliquely at an angle of 5–20 degrees in a symmetrical relation with each other with respect to the bisector of each corner portion so as to form a ridge therebetween, in that breaker protrusions extend from the center land toward each of the corner portions and have a tapered end, in that breaker walls extend obliquely upwardly from rear end portions of the each pair of slopes to front end portions of the breaker protrusions, respectively, and in that ellipsoidal grooves are formed in the breaker groove so as to be contiguous with the breaker walls.

With the throw-away insert according to the present invention, the chip discharge angle changes according to the cutting conditions, so that the relative breaker width (the distance between the point where chips form and the point where chips collide) will adjust to an optimum value. Such conditions are described below more specifically.

[while the depth of cut is small (d=1.0-2.0 mm)]

While the feed rate is within an ordinary range (f=0.3-0.4 mm/rev.), chips formed near a corner portion 2 exhibit a tendency to flow in the direction of line C. But, due to the guiding effect of slopes 4 formed upstream with respect to the direction of feed, their discharge angle will reduce gradually until they collide against breaker walls 7 provided upstream of a breaker protrusion 6. The chips then curl and get broken.

While the feed rate is high (f=0.5-0.7 mm/rev.), the chips are guided by the slopes 4 in the same manner, colliding with the breaker walls 7. But because the chips are rather thick and difficult to break in this case, they are guided along the walls 7 so as to flow into grooves 9 contiguous with the terminal ends of the walls 7. The chips are broken when subjected to strain by a concave surface 9a defining each groove 9 near the center land 5 (FIG. 2). Accordingly, the chips formed while the feed rate is high are curled with a larger radius of curvature than the chips formed while the feed rate is normal. This makes it possible to discharge even thick chips smoothly and thus to prevent the clogging of the chips.

[while the depth of cut is large (d=4-5 mm)]

While the feed rate is within an ordinary range (f=0.3-0.4), due to smaller guiding action provided by the slopes 4, the chip discharge angle is only slightly smaller than the angle shown in FIG. 6, i.e. 90 degrees. Anyhow, the chips are curled and broken by colliding against the breaker walls 7 provided upstream of breaker protrusion 6 with respect to the direction of feed.

When the feed rate is high (f=0.5-0.7), thicker chips exhibit a stronger tendency to flow along the surface of the insert than thin ones. Thus the slopes 4 provide a stronger guiding effect while the feed rate is high. Accordingly, the chips are curled mainly on the concave surface 9a defining the groove 9. This serves to increase the effective breaker width, thus allowing the chips to smoothly curl and break.

By the combined action of the slopes 4, the breaker walls 7 formed upstream of the breaker protrusion and the ellipsoidal grooves 9, chips can be disposed of according to the cutting conditions. Thus the throw-away insert according to the present invention can carry out not only the cutting operation corresponding to the new high-feed rate region shown in FIG. 4, but also other new cutting operations which are expected to become more and more in demand.

With the throw-away insert according to this invention, by forming the slopes in the breaker groove near the corner portion so as to define a ridge therebetween, and the breaker walls contiguous with the slopes and the ellipsoidal grooves, thinner chips which are produced while the feed rate is low can be disposed of when they collide against the breaker walls, whereas thicker chips, which are produced while the feed rate is high, can be disposed of owing to the ellipsoidal grooves provided downstream of the breaker walls with respect to the direction of discharge. This makes it possible to discharge chips without the possibility of their clogging. Also, a smooth cutting of chips becomes possible in the new high-feed rate cutting operation in which the depth of cut is to be small and the feed rate is high.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
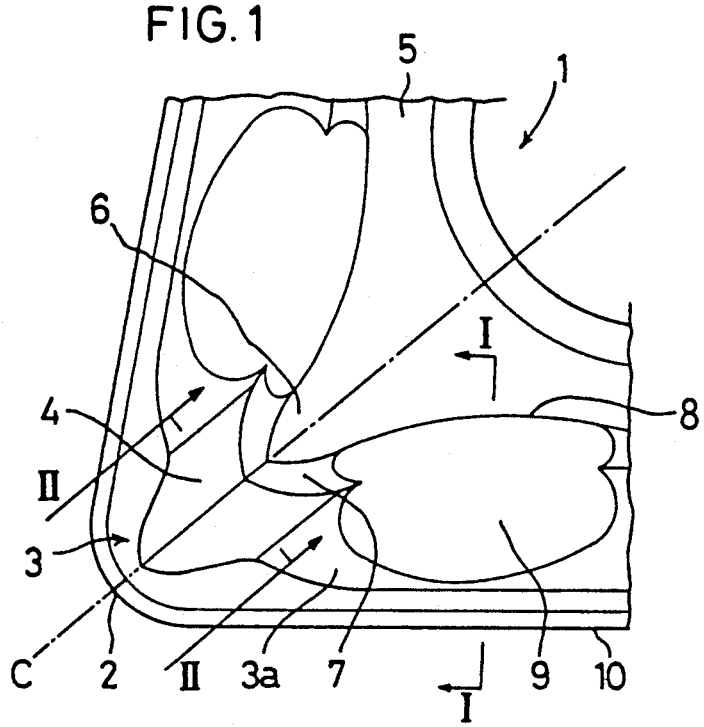
FIG. 1 is a plan view of a portion of a first embodiment of a throw-away insert according to the present invention.
Figure 2:
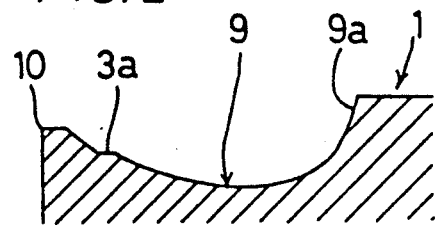
FIG. 2 is a sectional view taken along line I—I of FIG. 1.
Figure 3:
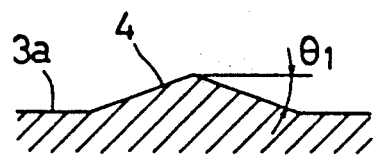
FIG. 3 is a sectional view taken along line II—II of FIG. 1.
Figure 4:
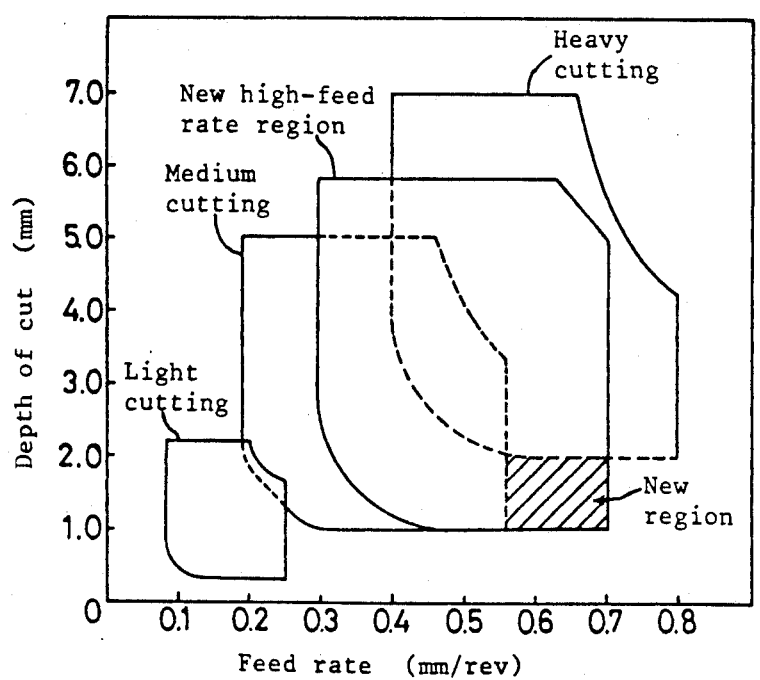
FIG. 4 is a graph showing the regions which the insert of the first embodiment can cover.
Figure 5:
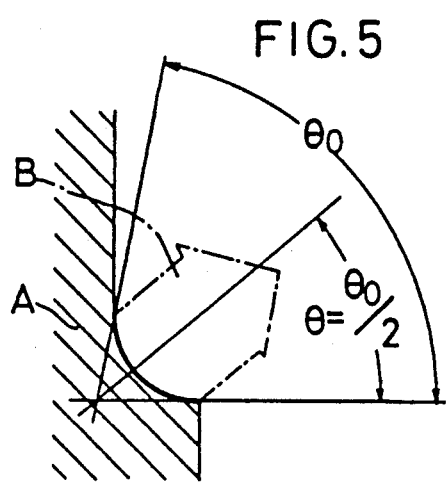
FIGS. 5 and 6 are plan views showing the chip discharge directions when the depth of cut is small and large, respectively.
Figure 6:
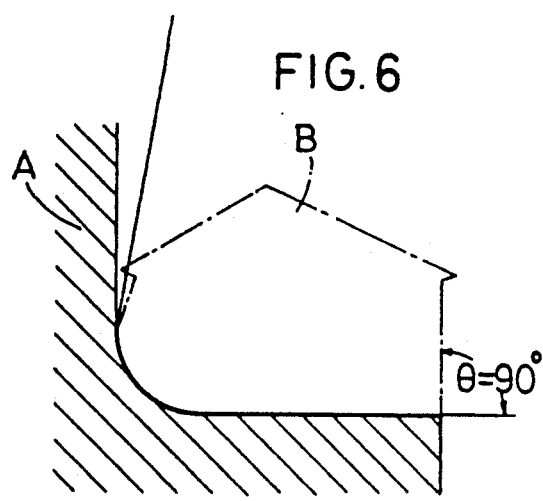
Figure 7:
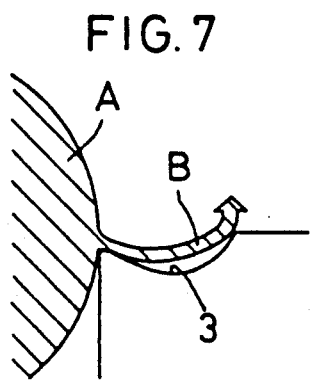
FIGS. 7 and 8 are sectional views showing how the chips are discharged when the feed rate is low and high, respectively.
Figure 8:
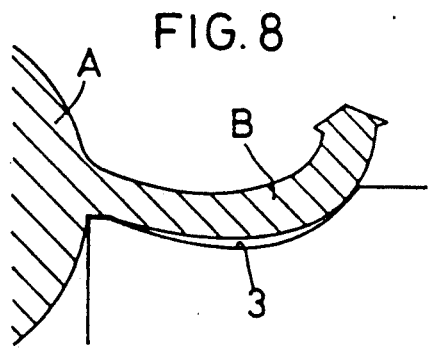

FIG. 1 shows the preferred embodiment of the throw-away insert according to this invention. Its basic structure is as described above. The slopes 4 of this throw-away insert 1 should be inclined at an angle of $5° \leq \theta_1 \leq 20°$. If the angle of inclination is less than 5 degrees, the desired effect of the chip discharge angle may be insufficient while the feed rate is low. If it is more than 20 degrees, the chips will not flow smoothly while the feed rate is high and the depth of cut is large.

Figure 9:
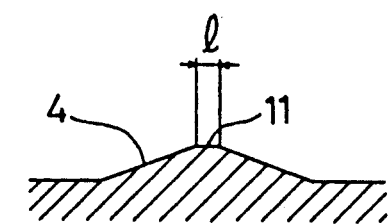
FIGS. 9 and 10 are sectional views showing different versions of ridges which can be defined between slopes of the insert according to the present invention.
Figure 10:
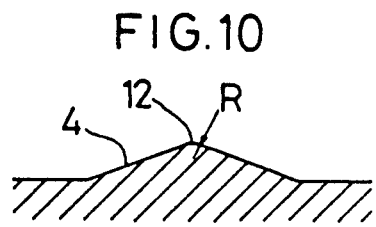

FIGS. 9 and 10 show different types of ridges defined atop the slopes 4. As shown in FIG. 9 by providing a flat portion 11 as the ridge, when the depth of cut is small (d=1.0 mm), the chips will flow in the direction of the line C, unaffected by the slopes 4, and will abut the breaker walls 7 taking the shortest course. Thus the chips can easily curl and break. The flat portion 11 should have a width of preferably 0.1-0.2 mm. If it is too narrow, it will not be effective whereas if it is too wide, the area of the slopes 4 will be unduly small As shown in FIG. 10, the ridge may be a curved surface 12 formed atop the slopes 4 and having a radius of curvature R of 0.2-0.5 mm. The curved surface 12 has the same function as the flat portion 11.

In order to guide thicker chips into the ellipsoidal grooves 9, the breaker protrusion 6 should have its tip tapered so that the breaker walls 7 will form a given angle with respect to the straight portion 10 defining each cutting edge, as shown in FIG. 1.

Figure 11:
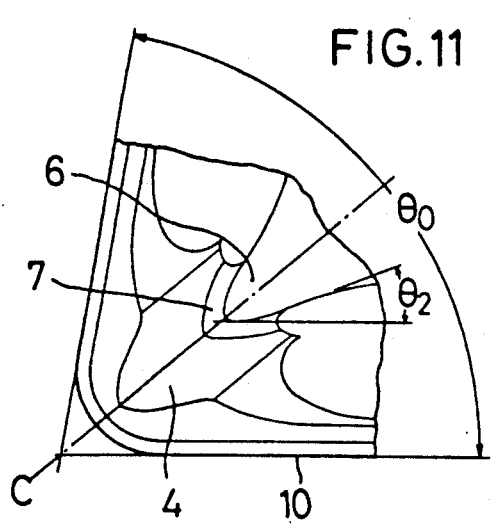
FIGS. 11 and 12 are plan views of other embodiments of inserts, having different breaker protrusions, according to the present invention.

To achieve this, the breaker protrusion 6 shown in FIG. 11 has its tip curved with a radius of curvature of 0.2-0.5 mm and is defined by ridges extending at an angle of $\theta_2$ with respect to the straight portion 10 (such angle preferably being within a range of $1° \leq \theta_2 < \theta_0/2$).

Figure 12:
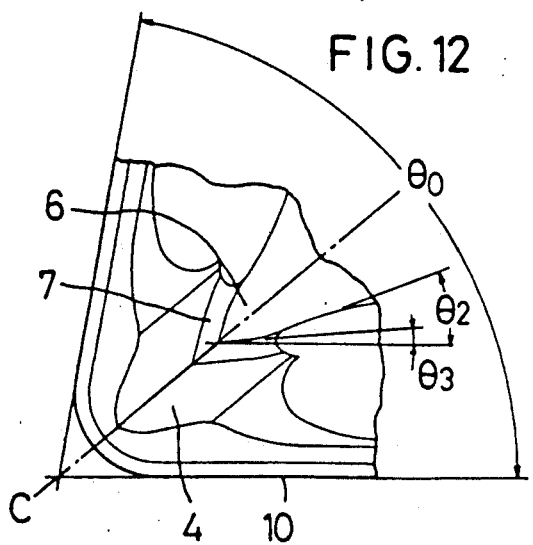

The breaker protrusion 6 shown in FIG. 12 has a pointed tip end subtending an angle which is smaller by $2 \cdot \theta_3$ than the angle $\theta_0$ and is also defined by ridges extending at an angle $\theta_2(>\theta_3)$ with respect to the straight portion 10.

The surfaces defining the ellipsoidal grooves 9 are contiguous with both the surfaces defining the breaker grooves 3a and the breaker walls 7. In the embodiment shown in FIG. 1, the lines between the surfaces defining the grooves 9 and the land constitute ridges 8 extending along the grooves.

What is claimed is:

1. A throw-away insert having a corner portion, a cutting edge extending at the periphery of the insert, a center land, a breaker groove extending therein between said cutting edge and said center land, a pair of slopes protruding upwardly in said breaker groove near said corner portion of the insert, said slopes extending obliquely at an angle of 5-20 degrees in a symmetrical relation with each other with respect to the bisector of the angle subtended by said corner portion so as to define a ridge therebetween, a breaker protrusion extending from said center land toward said corner portion and having a tapered end, breaker walls extending obliquely upwardly from rear end portions of said pair of slopes remote from said corner portion to a front end of said breaker protrusion facing said corner portion, and ellipsoidal grooves formed in said breaker groove and contiguous with said breaker walls, said protrusion have a tip at the front end portion thereof having a small radius of curvature and defined by ridges each extending at an angle of $\theta_2$ with respect to respective straight portions of said cutting edge, said angle $\theta_2$ being approximately 1° to one-half of said angle subtended by said corner portion.

2. A throw-away insert as claimed in claim 1, wherein said ridge is a narrow flat surface.

3. A throw-away insert as claimed in claim 1, wherein said ridge is a curved surface having a small radius of curvature.

4. A throw-away insert having a corner portion, a cutting edge extending at the periphery of the insert, a center land, a breaker groove extending therein between said cutting edge and said center land, a pair of slopes protruding upwardly in said breaker groove near the corner portion of said insert, said slopes extending obliquely at an angle of 5-20 degrees in a symmetrical relation with each other with respect to the bisector of the angle subtended by said corner portion so as to define a ridge therebetween, a breaker protrusion extending from said center land toward said corner portion and having a tapered end, breaker walls extending obliquely upwardly from near end portions of said pair of slopes remote from said corner portion to a front end portion of said breaker protrusion facing said corner portion, and ellipsoidal grooves formed in said breaker groove and contiguous with said breaker walls, said protrusion terminating at a pointed end subtending an angle smaller than that subtended by said corner portion by 2·$\theta_3$, wherein $\theta_3$ is approximately −5° to 10°, and said protrusion being defined by ridges from which said pointed end extends toward said corner portion, the ridges extending at an angle $\theta_2$ with respect to a straight portion of said cutting edge, said angle $\theta_2$ being greater than said angle $\theta_3$.

5. A throw-away insert as claimed in claim 4, wherein said ridge is a narrow flat surface.

6. A throw-away insert as claimed in claim 4, wherein said ridge is a curved surface having a small radius of curvature.

* * * * *